United States Patent [19]

Saleman

[11] Patent Number: 5,235,779
[45] Date of Patent: Aug. 17, 1993

[54] ROACH OR RODENT TRAP

[76] Inventor: Walter M. Saleman, 840 The Rialto, Venice, Fla. 34285

[21] Appl. No.: 9,269

[22] Filed: Jan. 26, 1993

[51] Int. Cl.[5] .......................................... A01M 23/02
[52] U.S. Cl. .......................................... 43/62; 43/61; 43/67
[58] Field of Search .................. 43/61, 62, 67, 64, 65, 43/121

[56] References Cited

U.S. PATENT DOCUMENTS

| | | | |
|---|---|---|---|
| 104,570 | 6/1870 | Fox | 43/62 |
| 106,858 | 8/1870 | Newton | 43/62 |
| 334,443 | 1/1886 | Kobelke | 43/62 |
| 336,998 | 3/1886 | Hauserman | 43/62 |
| 516,937 | 3/1894 | Leflet | 43/61 |
| 1,587,536 | 6/1926 | Lobit | 43/61 |
| 1,650,458 | 11/1927 | McDonald | 43/62 |
| 2,707,844 | 5/1955 | Ciolli | 43/62 |
| 3,008,261 | 11/1961 | Long | 43/62 |
| 5,005,313 | 4/1991 | Lindros | 43/67 |
| 5,024,021 | 6/1991 | Wang | 43/62 |
| 5,148,625 | 9/1992 | Saleman | 43/67 |
| 5,175,957 | 1/1993 | West | 43/61 |

FOREIGN PATENT DOCUMENTS 0852301 9/1981 U.S.S.R. ................................ 43/62

*Primary Examiner*—Kurt C. Rowan
*Attorney, Agent, or Firm*—Charles J. Prescott

[57] ABSTRACT

A roach or rodent trap structured for capturing one or more roaches or rodents as a piece of bait is being consumed within the trap. Slidably mating, telescopically extendable upper and lower generally cup-shaped members define a closed interior volume into which a roach or rodent may enter through a hole formed through a side wall of the lower member when the upper member is held in an armed position above the bottom of the lower housing. To hold the upper member in the armed position, a slender elongated trip rod downwardly extends from a central point of the top of the upper member, to be supported on a rigid piece of bait held above the bottom within a horizontal bait aperture of a bait table. The bait table is connected to and upwardly extends into the interior volume from the bottom of the lower member. When so supported by the trip rod on the rigid bait, the upper member will only drop by gravity from the armed position to a closed position after sufficient bait is consumed by roach or rodent to allow the remaining bait portion to pass through the bait aperture then closing the entrance holes and capturing all roaches or rodents within the device at that time. The trap is preferably transparent for viewing of captured prey before disposal.

12 Claims, 2 Drawing Sheets

ROACH OR RODENT TRAP

BACKGROUND OF THE INVENTION

This invention relates generally to means for eliminating roaches and rodents, and more particularly to a roach trap having a unique consumable bait supporting triggering mechanism.

Removal of roaches or rodents from the interior of buildings has drawn significant attention in the past. One main approach to roach and rodent removal is to the use of chemicals and glue traps which are either sprayed or disbursed within the building interior where the roaches or rodents are found. However, this approach has produced considerable deleterious effects upon humans and pets which also reside within the building.

Glue trap products sold under various names attempt to entrap roaches and rodents onto a sticky surface usually within a device such as a cardboard box with open ends. Small animals such as mice which get trapped in these devices suffer terribly for hours and days and are often thrown into the trash while still alive stuck to the adhesive. There is also very little incentive for a roach or rodent to want to enter one of these devices to begin with.

I have previously invented a roach trap as disclosed in U.S. Pat. No. 5,148,625 which teaches a device similar to that of the present invention, relying upon a piece of consumable bait to support a pivotally closable door mechanism. However, as with most traps, this device has only one door opening facing only one direction. This device may also be a little difficult for some people to bait and arm, requiring hand held alignment of the pivotally closable door mechanism.

A number of other prior art devices are also known to applicant for trapping rodents as follows:
Hunter, U.S. Pat. No. 4,179,835
Beard, U.S. Pat. No. 4,583,317
Straver, U.S. Pat. No. 4,682,441
Brubaker, Jr., U.S. Pat. No. 4,310,984
Muelling, U.S. Pat. No. 4,232,472
Hunter, U.S. Pat. No. 4,682,440
Wyant, U.S. Pat. No. 4,162,588
VanKuren, U.S. Pat. No. 3,113,395
Gilbaugh, U.S. Pat. No. 4,080,749

However, not only are these inventions directed to only the trapping of rodents, as opposed to roaches. They are also structured to capture only one rodent at a time.

The present invention, similar to my '625 patent, is provided to entrap a number of roaches or rodents therewithin which are consuming a piece of bait. As the bait is consumed and reaches a certain reduced size, it then passes through a bait support aperture, thus triggering the lid to fall to a closed position. The bait utilized is and may be a peanut half because of its size and structure and the attractiveness of the peanut odor as food for roaches or rodents. Other bait shapes are also disclosed.

BRIEF SUMMARY OF THE INVENTION

This invention is directed to a roach or rodent trap structured for capturing one or more roaches or rodents as a piece of bait is being consumed within the trap. Slidably mating, telescopically extendable upper and lower generally cup-shaped members define a closed interior volume into which a roach or rodent may enter through an entrance hole formed through a side wall of the lower member when the upper member is held in an armed position above the bottom of the lower housing. To hold the upper member in the armed position, a slender elongated trip rod downwardly extends from a central point of the top of the upper member, to be supported on a rigid piece of bait held above the bottom within a horizontal bait aperture of a bait table. The bait table is connected to and upwardly extends into the interior volume from the bottom of the lower member. When so supported by the trip rod on the rigid bait, the upper member will only drop by gravity from the armed position to a closed position after sufficient bait is consumed by roach or rodent to allow the remaining bait portion to pass through the bait aperture then closing the entrance holes and capturing all roaches or rodents within the device at that time. The trap is preferably transparent for viewing of captured prey before disposal and includes evenly spaced entrance holes facing in all directions.

It is therefore an object of this invention to provide a reusable roach or rodent trap which will capture a plurality of roaches or rodents therewithin for disposal.

It is yet another object of this invention to provide a roach or rodent trap preferably utilizing a peanut half as bait or the like which, when partially consumed, will then trigger the closing of the lid to capture roaches or rodents contained therewithin.

It is yet another object of this invention to preferably provide a transparent roach or rodent trap which facilitates viewing of the contents trapped therewithin.

It is yet another object of this invention to provide a roach or rodent trap which is easily washable and of sufficiently small size so as to be placed in tight quarters within the building where roaches normally travel.

It is yet another object of this invention to provide an easily armable roach or rodent trap which utilizes gravity to close and capture roaches or rodents lured thereinto.

It is yet another object of this invention to provide a roach or rodent trap which includes entrance holes facing in all directions to facilitate bait aroma disbursement and ease of roach or rodent entry.

It is yet another object of this invention to provide a more humane means of eliminating small rodents from building interiors.

In accordance with these and other objects which will become apparent hereinafter, the instant invention will now be described with reference to the accompanying drawings.

DETAILED DESCRIPTION OF THE INVENTION

Figure 2:
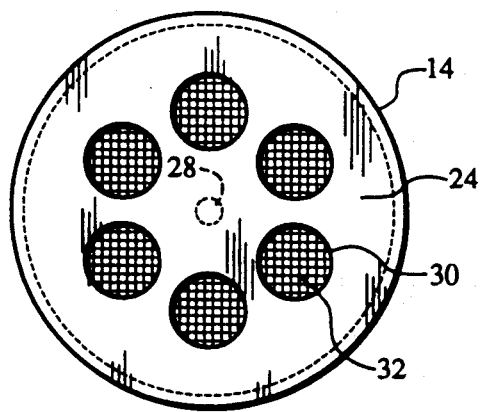
FIG. 2 is a top plan view of the upper member of FIG. 1.
Figure 1:
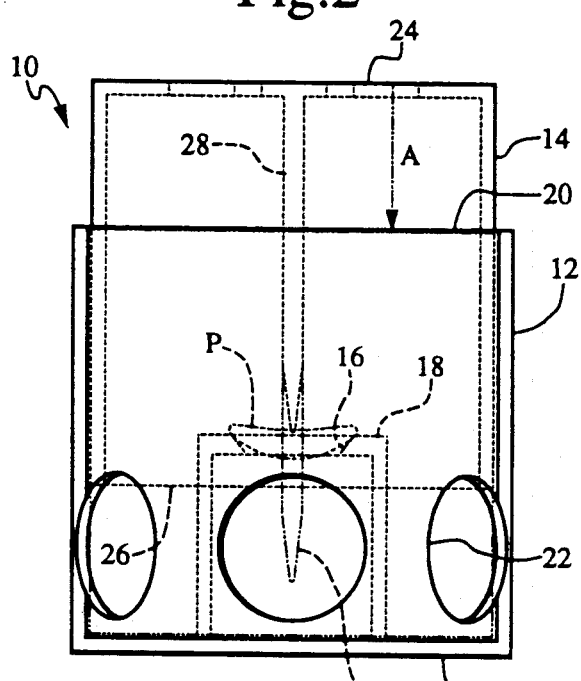
FIG. 1 is a side elevation view of one embodiment of the invention in its armed position.
Figure 3:
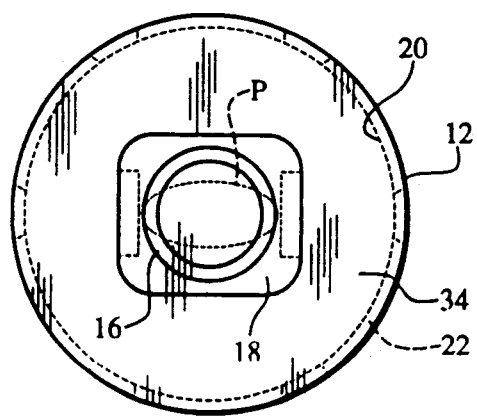
FIG. 3 is a top plan view of the lower member of FIG. 1 with the upper member removed.

Referring now to the drawings, and particularly to FIGS. 1 to 3, one embodiment of the invention is there shown at numeral 10 and includes a lower cup-shaped member 12 and an upper cup-shaped member 14, both fabricated of thin-wall molded plastic material. The lower member 12 includes cylindrical side walls which upwardly extend from a flat bottom 34 to define an open upper end 20 thereof. The upper member 14 also includes circular upright side walls extending downwardly from a flat top 24 to an open lower end 26 thereof.

Upper member 14 is sized to freely slidably translate up and down in telescopic fashion within the lower member 12. When the upper and lower members 14 and 12 are slidably interengaged as shown in FIG. 1, they define an interior volume.

Connected and upwardly extending into the interior volume from bottom 34 is a bait table 18 having a horizontal bait aperture 16 formed centrally thereon. The bait aperture 16 has tapered margins as shown in FIG. 1 so as to supportively receive a piece of rigid bait such as a peanut half P supported therewithin. The lower member 12 also includes one or more prey entrance holes 22 formed immediately adjacent the bottom 34 so that when the device 10 is armed, either a roach or a rodent may freely enter into the interior bottom therethrough.

The upper member 14 includes a centrally positioned upright trip rod 28 which is sized in length somewhat shorter than the overall height of the upper member 14 so that the free lower distal end of the trip rod 28 will come in contact against the bait P and support the upper member 14 so that its lower opening 26 is positioned above the bottom 34. In this armed configuration, the holes 22 are opened, allowing prey to enter into the interior volume of the device 10.

After the prey enters into the interior volume of the device 10, consumption of the bait P is likely to commence. When the bait P has been sufficiently consumed, it will pass downwardly through the bait aperture 16, allowing trip rod 28 and the connected upper member 14 to fall downwardly in the direction of arrow A to a closed position wherein the lower opening 26 rests against bottom 34, thus closing off holes 22. Because this sequence of events is sufficiently instantaneous, all prey are trapped within the device 10.

To further assist in dispersion of the bait odor from a baited trap and to sustain the lives of trapped animals, one or more ventilation apertures 30 having screen or mesh 32 are also provided. These apertures assist also in the rapid closure of the trap by venting internal air pressure as door closes.

Figure 5:
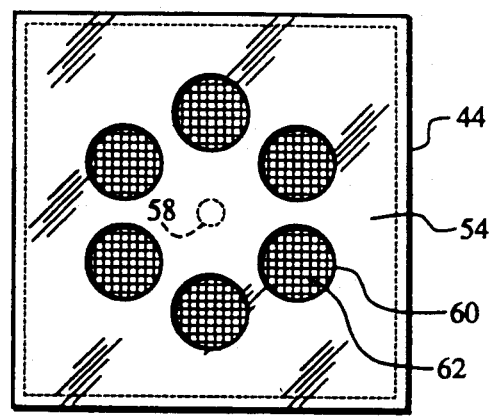
FIG. 5 is a top plan view of the upper member of the invention shown in FIG. 4.
Figure 4:
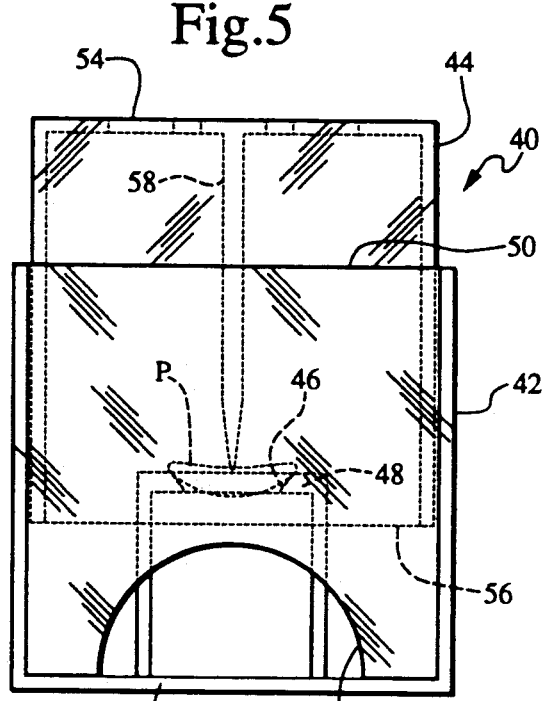
FIG. 4 is a side elevation view of another embodiment of the invention.
Figure 6:
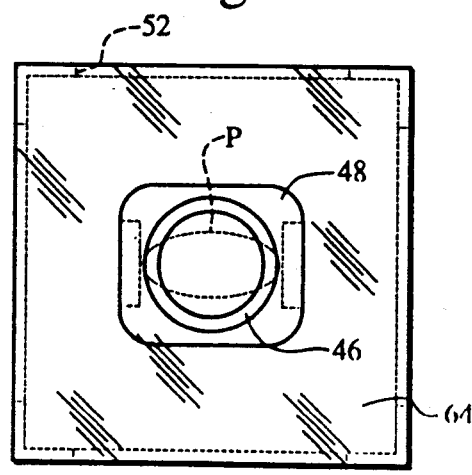
FIG. 6 is a top plan view of the lower member of the invention shown in FIG. 4 with the upper member removed.

Referring now to FIGS. 4, 5 and 6, another embodiment of the invention is shown generally at numeral 40 and is generally structured similarly to that previously described. However, in this embodiment, the lower and upper members 42 and 44 are molded of transparent thin-wall plastic to facilitate inspection of the trapped prey contained within the device. In this embodiment 40, the lower member 42 includes a bait table 48 having a bait aperture 46 formed therein connected to the bottom 64 as previously described. The upright side walls of the lower member 42 include entrance holes 52 formed into all of the side wall surfaces which upwardly extend from the bottom 64.

The upper member 44 includes a trip rod 58 which downwardly extends from a central point of a top 54, the trip rod 58 being somewhat shorter than the overall height of the upper member 44 so that the lower distal end of the trip rod 58 will support the upper member 44 resting atop a piece of bait P in an armed position as previously described. In this armed configuration, a roach or rodent may enter through the arched hole 52 into the interior volume to consume the bait P.

Again, the humane user prefers to have ventilation apertures 60 covered by mesh 62 in place within top 54 so as to allow the captured critters to remain alive until properly disposed of.

Figure 7:
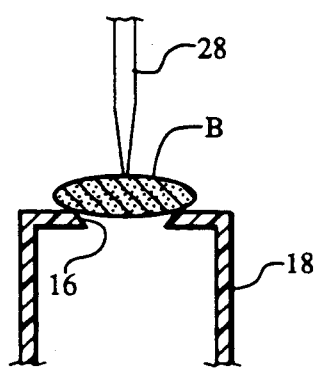
FIG. 7 is a partial cross section view of the bait table of either FIGS. 1 or 4 showing an alternate embodiment of a rigid piece of bait.
Figure 8:
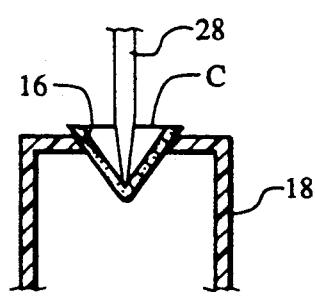
FIG. 8 is a partial cross section view of the bait table of either FIGS. 1 or 4 showing another alternate embodiment of a rigid piece of bait.
Figure 9:
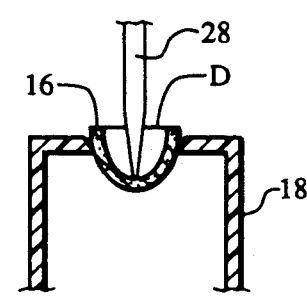
FIG. 9 is a partial cross section view of the bait table of either FIGS. 1 or 4 showing yet another alternate embodiment of a rigid piece of bait.

Referring lastly to FIGS. 7, 8 and 9, alternate embodiments of formed rigid bait B, C, and D positioned atop the bait table 18 within bait aperture 16 as shown in FIG. 1 are described. Each of the formed baits B, C, and D are made of rigidly connected food particles having a suitable scent and flavor for attracting the appropriate prey. Bait B is ellipsoidal, while bait C is generally conically shaped having a V-shaped cross section, while bait D has a generally U-shaped cross section, all of which will support the distal lower end of trip rod 28 as shown.

While the embodiments 10 and 40 of the invention are formed of opaque or transparent molded plastic material, respectively, the device may be fabricated of plastic panels adhered at their joints having translucent panels as well.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A roach or rodent trap for confinement and disposal of one or more roaches or rodents comprising:
    a lower member having an upright side wall and a closed bottom which define an interior volume, said lower member side wall upwardly extending to define an open upper end of said lower member;
    a bait table connected and positioned centrally atop said bottom, said bait table having a generally horizontal bait support aperture formed therethrough spaced above said bottom structured to support a rigid piece of bait such as a peanut whereby the bait may be inserted partially into, but not through, said aperture;
    at least one entrance hole formed through said lower member side wall sized and positioned relative to said bottom to permit a roach or rodent to freely pass through said entrance hole into said interior volume;
    an upper member separate from said outer member and having an upright side wall and a top, said upper member side wall downwardly extending to define an open lower end of said upper member;

said upper member sized to freely slide vertically within such lower member, said upper member side wall closing off said entrance hole when said upper member is in a downward closed position resting atop said bottom;

an upright trip rod connected at an upper end thereof to and downwardly extending from a central point of said top, a free distal lower end of said trip rod aligned with said bait aperture when said upper member is engaged within said lower member;

said trip rod distal end being supported against the bait and, supporting said upper member in an armed position above said bottom a vertical distance sufficient for the roach or rodent to enter into said interior volume through said aperture;

said upper member falling by gravity to said closed position when the roach or rodent consumes a sufficient portion of the bait to allow said trip rod to pass downwardly through said bait aperture.

2. A roach or rodent trap as set forth in claim 1, wherein:
said upper and lower housings are transparent.

3. A roach or rodent trap as set forth in claim 2, wherein:
said top includes a ventilation aperture for allowing air to pass therethrough, yet preventing the roach or rodent to pass therethrough.

4. A roach or rodent trap as set forth in claim 1, wherein:
the bait is formed of adhered food particles into a generally ellipsoidal configuration.

5. A roach or rodent trap as set forth in claim 1, wherein:
the bait is formed of adhered food particles into a thin-wall cup-shaped member having a generally V-shaped vertical cross section.

6. A roach or rodent trap as set forth in claim 1, wherein:
the bait is formed of adhered food particles into a thin-wall cup-shaped member having a generally U-shaped cross section.

7. A roach or rodent trap for confinement and disposal of a roach or rodent comprising:
an upper and a lower thin-wall cup-shaped member each having upright side walls and a closed top and a closed bottom, respectively;

said upper member having an open lower end and said lower member having an open upper end, said upper and lower members freely telescoping one to another and defining an interior volume sized to receive a roach or a rodent therewith;

a bait table connected and positioned centrally atop said bottom, said bait table having a generally horizontal bait support aperture formed through an upper surface thereof, said bait support aperture spaced above said bottom and within said interior volume;

at least one entrance hole formed through one said lower member side wall and sized and positioned relative to said bottom to permit the roach or rodent to freely pass through said entrance hole into said interior volume;

an upright trip rod connected at an upper end thereof to, and downwardly extending from, a central point of said top, a free distal end of said trip rod aligned with said bait aperture;

said trip rod distal and extending below said bait aperture only when said upper and lower members are in a closed position wherein said upper member lower open end is resting atop said bottom;

said upper member side wall closing off said entrance hole when said upper and lower members are in the closed position.

8. A roach or rodent trap as set forth in claim 7, wherein:
said upper and lower members are transparent.

9. A roach or rodent trap as set forth in claim 8, wherein:
said top includes a ventilation aperture for allowing air to pass therethrough, yet preventing the roach or rodent to pass therethrough.

10. A roach or rodent trap as set forth in claim 7, further comprising:
a rigid piece of bait formed of adhered food particles into a generally ellipsoidal configuration structured to be supported within said aperture above said bottom.

11. A roach or rodent trap as set forth in claim 7, further comprising:
a rigid piece of bait formed of adhered food particles into a thin-wall cup-shaped bait member having a generally V-shaped vertical cross section structured to be supported within said aperture above said bottom.

12. A roach or rodent trap as set forth in claim 7, further comprising:
a rigid piece of bait formed of adhered food particles into a thin-wall cup-shaped bait member having a generally U-shaped vertical cross section structured to be supported within said aperture above said bottom.

* * * * *